(12) United States Patent
Ichikawa et al.

(10) Patent No.: US 9,360,079 B2
(45) Date of Patent: Jun. 7, 2016

(54) VIBRATION DAMPING DEVICE

(71) Applicant: TOKAI RUBBER INDUSTRIES, LTD., Komaki-shi, Aichi (JP)

(72) Inventors: Hiroyuki Ichikawa, Kani (JP); Takayoshi Yasuda, Kitanagoya (JP); Akio Saiki, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/276,462

(22) Filed: May 13, 2014

(65) Prior Publication Data

US 2014/0246558 A1    Sep. 4, 2014

Related U.S. Application Data

(63) Continuation of application No. PCT/JP2012/007361, filed on Nov. 16, 2012.

(30) Foreign Application Priority Data

Feb. 14, 2012    (JP) .................................. 2012-029525

(51) Int. Cl.
*F16F 13/08*    (2006.01)
*F16F 15/08*    (2006.01)
(Continued)

(52) U.S. Cl.
CPC ................. *F16F 13/08* (2013.01); *F16F 13/10* (2013.01); *F16F 13/107* (2013.01);
(Continued)

(58) Field of Classification Search
CPC ...................................................... F16F 13/08
See application file for complete search history.

(56) References Cited

U.S. PATENT DOCUMENTS 5,316,275 A    5/1994  Maeno et al.
5,775,666 A *  7/1998  Tsukamoto et al. ...... 267/140.13
(Continued)

FOREIGN PATENT DOCUMENTS

FR    2 885 327      11/2006
JP    A-7-248044     9/1995
(Continued)

OTHER PUBLICATIONS

Feb. 19, 2013 International Search Report issued in International Application No. PCT/JP2012/007361 (with translation).
(Continued)

*Primary Examiner* — Joshua J Michener
*Assistant Examiner* — Chiedu Chibogu
(74) *Attorney, Agent, or Firm* — Oliff PLC

(57) ABSTRACT

A vibration damping device including a first mounting member arranged on a lower side of a second mounting member, the first and second mounting members being elastically connected by a main rubber elastic body, and an outer bracket arranged on the lower side of the second mounting member. A coupling part is constituted by engagement between a bottom edge of the second mounting member and a top edge of the outer bracket, and the second mounting member is configured to be attached to a vibration source via the outer bracket. The outer bracket is arranged in opposition to the first mounting member in an axis-perpendicular direction, and an axis-perpendicular stopper member that regulates relative displacement between the first and second mounting members in the axis-perpendicular direction is constituted by contact between the first mounting member and the outer bracket.

5 Claims, 12 Drawing Sheets

(51) Int. Cl.
*F16F 13/10* (2006.01)
*F16F 13/26* (2006.01)
*F16F 13/14* (2006.01)
*F16F 15/02* (2006.01)
*F16M 13/02* (2006.01)

(52) U.S. Cl.
CPC .......... *F16F 13/1409* (2013.01); *F16F 13/262* (2013.01); *F16F 15/022* (2013.01); *F16F 15/08* (2013.01); *F16M 13/02* (2013.01)

(56) References Cited

U.S. PATENT DOCUMENTS

| | | | |
|---|---|---|---|
| 5,971,376 A | | 10/1999 | Mori et al. |
| 6,082,718 A | * | 7/2000 | Yamada et al. ........... 267/140.14 |
| 6,131,893 A | * | 10/2000 | Seynaeve et al. ........ 267/140.13 |
| 7,389,976 B2 | * | 6/2008 | Maeno et al. ............ 267/140.13 |
| 7,584,945 B2 | * | 9/2009 | Maeno et al. ............ 267/140.13 |
| 7,677,537 B2 | | 3/2010 | Okanaka et al. |
| 2001/0026038 A1 | * | 10/2001 | Muramatsu et al. ..... 267/140.11 |
| 2002/0195758 A1 | | 12/2002 | Yamamoto et al. |
| 2003/0011116 A1 | | 1/2003 | Kodama et al. |
| 2004/0201150 A1 | * | 10/2004 | Okanaka et al. ......... 267/140.11 |
| 2004/0262830 A1 | * | 12/2004 | Maeno et al. ............. 267/140.4 |
| 2007/0262502 A1 | | 11/2007 | Okanaka et al. |
| 2008/0262672 A1 | * | 10/2008 | Ohta .................... G01M 7/025 701/31.4 |

FOREIGN PATENT DOCUMENTS

| | | | |
|---|---|---|---|
| JP | A-8-54038 | 2/1996 | |
| JP | 9089037 A | 3/1997 | |
| JP | A-11-311291 | 11/1999 | |
| JP | A-2000-266105 | 9/2000 | |
| JP | A-2002-257182 | 9/2002 | |
| JP | 2004263785 A | 9/2004 | |
| JP | A-2008-128376 | 6/2008 | |
| JP | A-2009-14080 | 1/2009 | |
| JP | A-2009-41666 | 2/2009 | |
| JP | EP 2025969 A2 * | 2/2009 | .............. F16F 13/10 |
| JP | A-2009-92174 | 4/2009 | |
| JP | A-2009-243645 | 10/2009 | |
| JP | A-2009-264517 | 11/2009 | |
| JP | A-2010-14172 | 1/2010 | |
| JP | A-2011-64258 | 3/2011 | |
| JP | B-4755147 | 8/2011 | |
| JP | A-2012-189164 | 10/2012 | |
| WO | WO 03/001077 A1 | 1/2003 | |
| WO | WO 03/008838 A1 | 1/2003 | |

OTHER PUBLICATIONS

Sep. 11, 2015 Office Action issued in Japanese Application No. 2012-029525.

* cited by examiner

VIBRATION DAMPING DEVICE

INCORPORATED BY REFERENCE

The disclosure of Japanese Patent Application No. 2012-029525 filed on Feb. 14, 2012 including the specification, drawings and abstract is incorporated herein by reference in its entirety. This is a Continuation of International Application No. PCT/JP2012/007361 filed on Nov. 16, 2012.

BACKGROUND OF THE INVENTION

1. Field of the Invention

The present invention relates to a vibration damping device to be used, for example, for engine mounts and the like on motor vehicles.

2. Description of the Related Art

Conventionally, there has been known a vibration damping device interposed between members constituting a vibration transmission system to link or support the members each other in a vibration damping manner, which has been considered for application to engine mounts and the like on motor vehicles. This vibration damping device, as shown in Japanese Unexamined Patent Publication No. JP-A-11-311291 and others, has a structure where a first mounting member and a cylindrical second mounting member are elastically connected by a main rubber elastic body.

By the way, in the vibration damping device described in JP-A-11-311291, the first mounting member is arranged on the upper side of the second mounting member to be attached to the vibration source such as a power unit, while the second mounting member is attached to the member to be vibration-damped such as a vehicular body. In contrast, Japanese Patent No. JP-B-4755147 proposes an inverted vibration damping device, wherein the first mounting member is arranged on the lower side of the second mounting member to be attached to the member to be vibration-damped, while the second mounting member is attached to the vibration source.

However, since a massive bracket is fixed by press-fitting to the second mounting member constituting the upper portion of the vibration damping device in the vibration damping device shown in JP-B-4755147, the center of gravity thereof is positioned in the upper portion, which posed a risk of developing problems such as lack of rigidity of the vibration damping device in the falling direction.

In addition, in the structure of JP-B-4755147, since an axis-perpendicular stopper member that restricts relative displacement between the first mounting member and the second mounting member in the axis-perpendicular direction (front-back direction of the vehicle) is provided on the upper portion of the vibration damping device, there were some problems such as further deviation upward of the center of gravity position and a risk of adverse effects on the load bearing performance or ride comfort caused by a stopper load of the axis-perpendicular stopper member acting on the upper portion of the vibration damping device during acceleration and deceleration of the motor vehicle.

SUMMARY OF THE INVENTION

It is therefore one object of this invention to provide an inverted-type vibration damping device of novel structure where the rigidity in the falling direction is fully maintained by lowering the center of gravity, while excellent load bearing performance and ride comfort are achieved when a stopper action is demonstrated by an axis-perpendicular stopper member.

That is, a first aspect of the present invention provides a vibration damping device comprising: a first mounting member; a cylindrical second mounting member extending vertically such that the first mounting member is arranged on a lower side of the second mounting member; a main rubber elastic body elastically connecting the first and second mounting members, the first mounting member being configured to be attached to a member to be vibration-damped while the second mounting member being configured to be attached to a vibration source; and a separate outer bracket arranged on the lower side of the second mounting member; wherein a coupling part is constituted by engagement between a bottom edge of the second mounting member and a top edge of the outer bracket, and the outer bracket is coupled to the second mounting member at the coupling part to extend downward while the second mounting member is configured to be attached to the vibration source via the outer bracket; the outer bracket extending downward is separated away from the first mounting member in an axis-perpendicular direction to be arranged in opposition thereto; and an axis-perpendicular stopper member that regulates relative displacement between the first mounting member and the second mounting member in the axis-perpendicular direction is constituted by contact between the first mounting member and the outer bracket.

In the vibration damping device with the structure according to the first aspect, the top edge of the outer bracket is coupled to the bottom edge of the second mounting member to allow the outer bracket to extend downward beyond the second mounting member. This lowers the center of gravity position of the vibration damping device due to the mass of the outer bracket to reduce the moment in the falling direction acting on the vibration damping device based on the inertial force thereof so that enough rigidity of the vibration damping device in the falling direction is sufficiently secured, thereby restricting the rolling displacement of the vibration source.

Also, an axis-perpendicular stopper member is provided on the lower side of the vibration damping device utilizing the outer bracket extending downward. Therefore, since the stopper load in the axis-perpendicular direction caused by the contact between the first mounting member and the outer bracket acts on the lower portion of the vibration damping device, the moment in the falling direction is reduced, thereby supporting the vibration source in a stable manner.

A second aspect of the present invention provides the vibration damping device according to the first aspect, wherein the first mounting member is provided with a stopper part protruding toward an outer periphery, the stopper part is arranged in opposition to the outer bracket at a given distance in the axis-perpendicular direction to constitute the axis-perpendicular stopper member by contact between the stopper part and the outer bracket, the outer bracket extends downward beyond the stopper part, a stopper piece is provided at a bottom edge of the outer bracket to be arranged on a lower side of the stopper part in opposition thereto at a distance and protrudes toward an inner periphery, and a rebound stopper member that regulates relative displacement between the first mounting member and the second mounting member in a direction of moving away from each other along an axis is constituted by contact between the stopper part and the stopper piece.

According to the second aspect, the center of gravity position of the vibration damping device can be further lowered by means of providing a stopper part in the first mounting member constituting the lower portion of the vibration damping device, while extending the outer bracket downward beyond the stopper part to provide the stopper piece at the bottom edge. Therefore, enough rigidity in the falling direction can be secured to achieve stable supporting and the like of the vibration source.

Furthermore, by utilizing the stopper part of the first mounting member and the stopper piece of the outer bracket, not only the axis-perpendicular stopper member but also the rebound stopper member is provided in the lower portion of the vibration damping device. Therefore, the center of gravity position is set at a lower position compared to the structure where the rebound stopper member is provided in the upper portion of the vibration damping device, thus enhancing the load bearing performance due to reduced moment in the falling direction.

A third aspect of the present invention provides the vibration damping device according to the first or second aspect, wherein an inner bracket is arranged on a lower side of the first mounting member to be supported by the first mounting member, a stopper piece protruding toward an inner periphery is provided at a bottom edge of the outer bracket and is arranged on an upper side of the inner bracket in opposition thereto at a distance, and a bound stopper member that regulates relative displacement between the first mounting member and the second mounting member in a direction of moving closer to each other along an axis is constituted by contact between the inner bracket and the stopper piece.

According to the third aspect, since the inner bracket is arranged on the lower side of the first mounting member while the stopper piece is provided at the bottom edge of the outer bracket, the center of gravity of the vibration damping device can be set at a lower position. Therefore, rigidity is maintained due to the reduction in the input (moment) in the falling direction, thus enabling to achieve a stable support of the vibration source.

In addition, since a bound stopper member is provided in the lower portion of the vibration damping device utilizing the inner bracket and the stopper piece, the center of gravity position can be set lower compared to the case of providing the bound stopper member in the upper portion of the vibration damping device. Therefore, the load bearing performance in the falling direction is enhanced.

A fourth aspect of the present invention provides the vibration damping device according to any one of the first to third aspects, wherein an attaching part to be attached to the vibration source is provided protruding sideways on the outer bracket at a position lower than the coupling part.

According to the fourth aspect, since the protruding position of the attaching part of the outer bracket on the side of the vibration source is lower than the coupling part, the center of gravity position can be set even lower. In addition, since vibration from the vibration source is inputted in the lower portion of the vibration damping device, the moment in the falling direction during a vibration input is reduced, thus enabling to obtain the intended support of the vibration source and vibration damping performances in a stable manner.

A fifth aspect of the present invention provides the vibration damping device according to any one of the first to fourth aspects, wherein the coupling part that couples the second mounting member and the outer bracket is provided continuously about an entire circumference.

According to the fifth aspect, the outer bracket is fixed firmly to the second mounting member by providing the coupling part continuously about the entire circumference. Therefore, load bearing performance is enhanced against a vibration input from the vibration source or against a stopper load input.

A sixth aspect of the present invention provides the vibration damping device according to any one of the first to fifth aspects, wherein a locking piece is provided to protrude to a lower side of the second mounting member than a portion bonded to the main rubber elastic body, while a locking protrusion is provided at the top edge of the outer bracket protruding toward an outer periphery so as to constitute the coupling part by means of inserting the locking protrusion of the outer bracket into the locking piece of the second mounting member and fixing the locking piece by caulking to the locking protrusion.

According to the sixth aspect, a coupling part is constituted to achieve a stable coupling between the second mounting member and the outer bracket by means of caulking fixation that deforms the locking piece to be engaged with the locking protrusion in the axial direction after inserting the locking protrusion of the outer bracket into the locking piece of the second mounting member. In addition, once a structure of fixation by caulking is adopted at the coupling part, enough fixation strength is obtained even if the length of the coupling part in the axial direction is small, which makes it easier to set the center of gravity at a lower position and to pretreat the coupling part of the second mounting member and the outer bracket, thereby facilitating the production of the vibration damping device.

A seventh aspect of the present invention provides the vibration damping device according to any one of the first to sixth aspects, wherein the second mounting member extends upward beyond the main rubber elastic body while an upper opening of the second mounting member is covered by a flexible film so as to form a fluid chamber with a non-compressible fluid sealed therein between the main rubber elastic body and the flexible film.

According to the seventh aspect, stabilization of the fluid-filled vibration damping device at a load input in the axis-perpendicular direction and enhancement of the load bearing performance can be effectively achieved. This is because, in the fluid-filled vibration damping device, the second mounting member extends upward since the fluid chamber is formed on the upper side of the main rubber elastic body. Therefore, due to its structural reasons, not only that the mass center of the vibration damping device tends to be positioned in the upper portion but also the position of the load input to the second mounting member in the axis-perpendicular direction is separated upward away from the first mounting member. By applying the present invention to the fluid-filled vibration damping device described above, the positions of the mass center of gravity including that of the outer bracket and the load input to the second mounting member in the axis-perpendicular direction can be lowered.

According to the present invention, with the inverted-type vibration damping device, the bottom edge of the second mounting member and the top edge of the outer bracket are coupled to each other and the outer bracket protrudes downward from the second mounting member. Thus, the center of gravity of the vibration damping device can be set at a lower position, thus efficiently maintaining the load bearing performance in the falling direction. In addition, an axis-perpendicular stopper member where a load is inputted in the axis-perpendicular direction is provided in the lower portion of the vibration damping device to reduce the moment in the falling direction caused by the input of the stopper load. Therefore, the load bearing performance is maintained more favorably, thus achieving stable support of the vibration source as well as stability of the vibration damping performance.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

Figure 1:
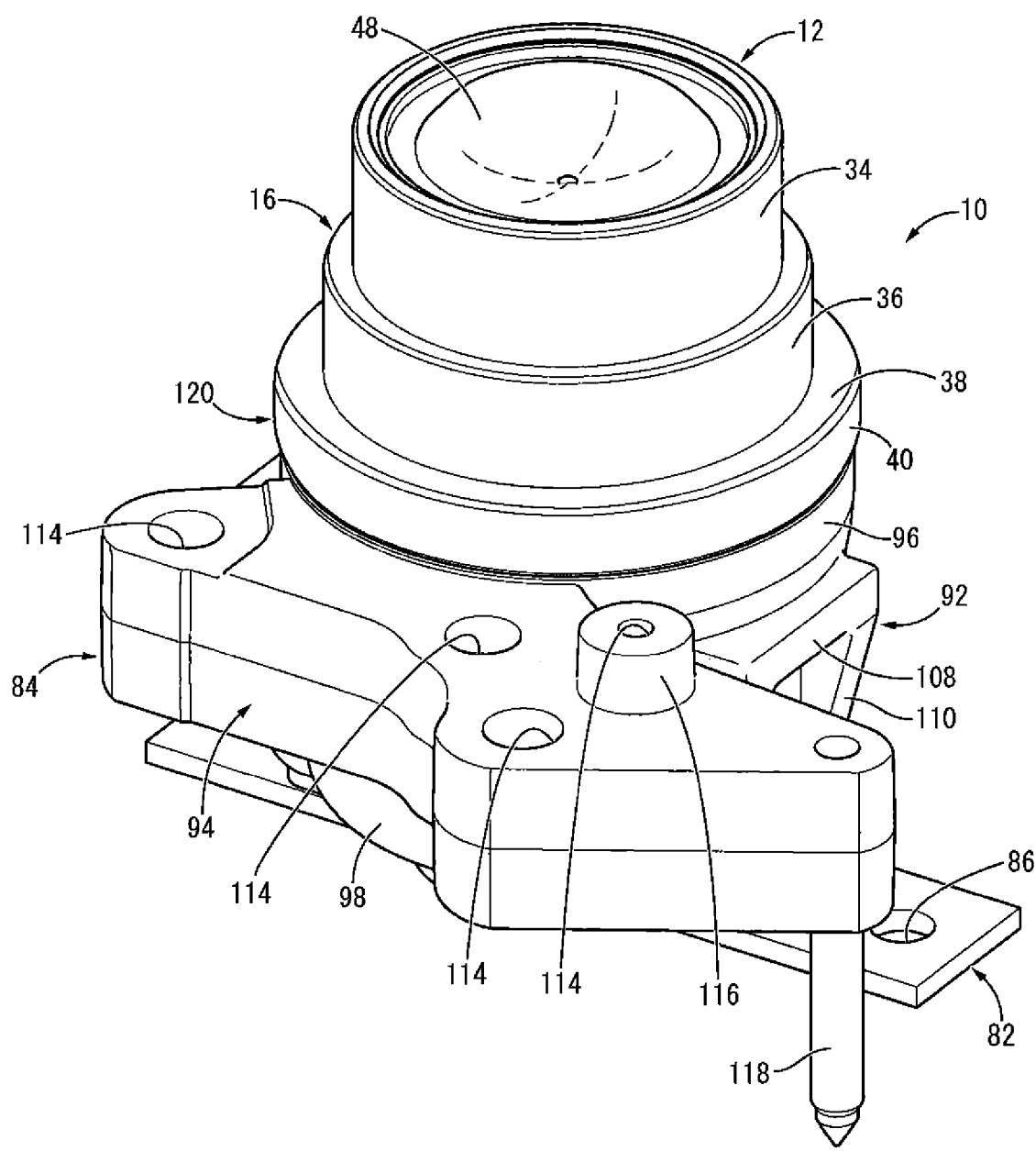
FIG. 1 is a perspective view of a vibration damping device in the form of an engine mount as a first embodiment of the present invention.
Figure 2:
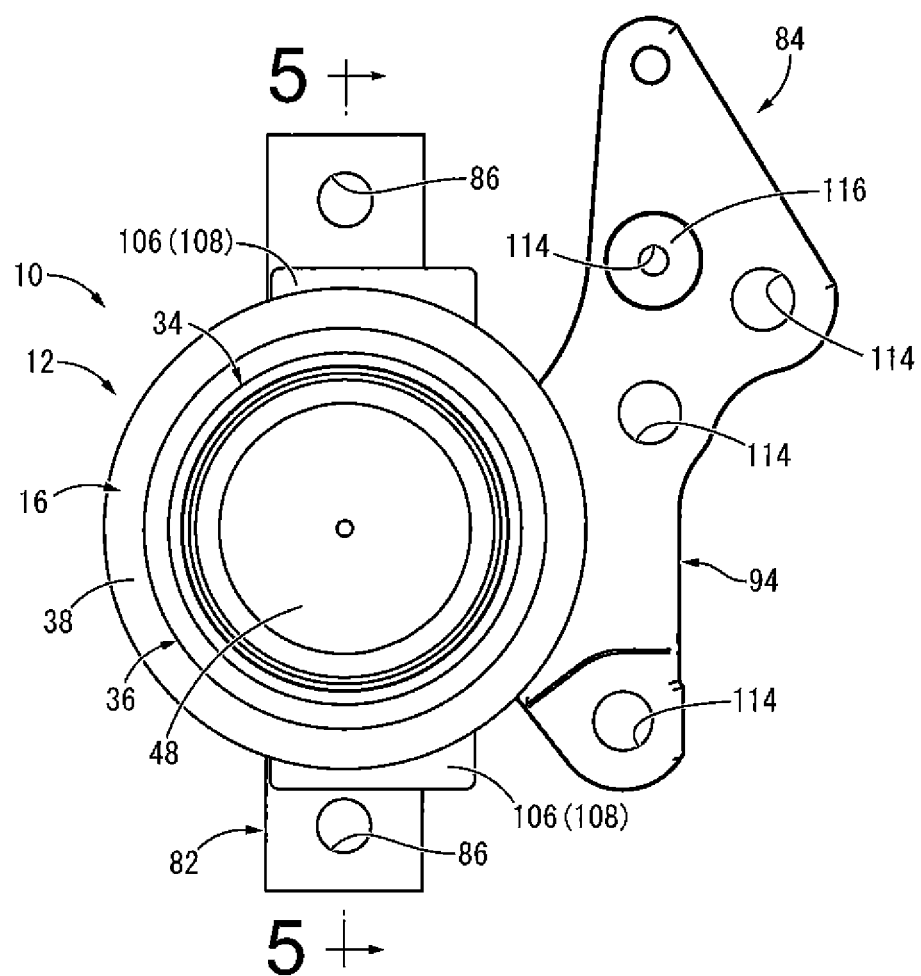
FIG. 2 is a plan view of the engine mount shown in FIG. 1.

FIGS. 1 to 5 show an automotive engine mount 10 as a first embodiment of the vibration damping device with the structure according to the present invention. The engine mount 10 is a fluid-filled vibration damping device comprising a mount main body 12, which has a structure where a first mounting member 14 and a second mounting member 16 are elastically connected by a main rubber elastic body 18. Then, the first mounting member 14 is attachable to a vehicular body 20 as a member to be vibration-damped, while the second mounting member 16 is to be attached to a power unit 22 as a vibration source. In the following descriptions, the "up-down direction" (or "vertical") generally means the up-down direction in FIG. 5, which is the central axis direction of the mount. Also, under a condition where the engine mount 10 is mounted on a vehicle, the downward direction in FIG. 2 is the forward direction of the vehicle.

More specifically, the first mounting member 14 is a high-rigidity member formed with iron, aluminum alloy or the like in an approximate shape of a circular block extending vertically in the axial direction overall, and its bottom edge is made to be a fixing part 24 where a screw hole 26 is formed extending along the central axis opening to the bottom face. Furthermore, above the fixing part 24, a stopper part 28 is integrally formed in an annular shape with a larger diameter than the fixing part 24 protruding toward the outer periphery about the entire circumference. In other words, the first mounting member 14 is provided with a lower contact surface 30 as a stepped part in the intermediate section in the axial direction, and the stopper part 28 with a large-diameter is provided on the upper side of the lower contact surface 30, while the fixing part 24 with a smaller diameter than that of the stopper part 28 is provided on the lower side. The outer peripheral surface of the stopper part 28 is made to be an axis-perpendicular contact surface 32 in a cylindrical shape.

The second mounting member 16 is a high-rigidity member, like the first mounting member 14, in an approximate shape of a thin-wall, large-diameter cylinder. Also, the second mounting member 16 is made in a stepped form, the upper portion of which is made to be a small-diameter cylinder part 34 and the lower portion a large-diameter cylinder part 36.

Furthermore, at the bottom edge of the second mounting member 16, a positioning part 38 and a locking piece 40 are provided. The positioning part 38 is in a flange shape protruding toward the outer periphery from the bottom edge of the large-diameter cylinder part 36, and the locking piece 40 in approximately a cylindrical shape protrudes downward from the outer peripheral edge of the positioning part 38. The positioning part 38 and the locking piece 40 are both integrally formed with the second mounting member 16 constituting the bottom edge thereof and are located on the lower side of the portion bonded to the main rubber elastic body 18 described later.

Then, the first mounting member 14 is arranged on the lower side of the second mounting member 16 on the same central axis, while the first mounting member 14 and the second mounting member 16 are elastically connected by the main rubber elastic body 18. The main rubber elastic body 18 is in an approximate shape of an inverted truncated cone or a circular cylinder with large diameter and thick wall where the first mounting member 14 is bonded by vulcanization to the bottom edge thereof, while the large-diameter cylinder part 36 of the second mounting member 16 is overlapped and bonded by vulcanization with the outer peripheral surface of the upper end thereof. Also, a large-diameter concave part 42 in an approximate shape of a bowl is formed on the main rubber elastic body 18 opening to the top face thereof. The main rubber elastic body 18 is formed as an integrally vulcanization molded component provided with the first mounting member 14 and the second mounting member 16. Also, the small-diameter cylinder part 34 of the second mounting member 16 extends upward beyond the main rubber elastic body 18.

Furthermore, a rubber stopper 44 is integrally formed with the main rubber elastic body 18. The rubber stopper 44 is a rubber elastic body formed to cover the outer peripheral and bottom faces of the stopper part 28 of the first mounting member 14 (the axis-perpendicular contact surface 32 and the lower contact surface 30), which extends integrally downward from the outer peripheral edge of the main rubber elastic body 18.

Moreover, a sealing rubber layer 46 is integrally formed with the main rubber elastic body 18. The sealing rubber layer 46 is a rubber elastic body with large diameter and thin wall extending integrally upward from the outer peripheral edge of the main rubber elastic body 18 to be fixed to cover the inner peripheral surface of the small-diameter cylinder part 34 of the second mounting member 16.

Also, a flexible film 48 is attached to the integrally vulcanization molded component of the main rubber elastic body 18. The flexible film 48 is a thin rubber film in an approximate shape of a circular plate or an inverted spherical dome provided with enough slack in the axial direction. In addition, a fixing member 50 is fixed to the outer periphery of the flexible film 48. The fixing member 50 is a hard member in approximately an annular or cylindrical shape to which the flexible film 48 is bonded by vulcanization to cover the central hole. Then, the fixing member 50 is fixed to the second mounting member 16 by means of treating it with a diameter-reducing process such as the 360-degree radial compression after being inserted into the upper portion of the small-diameter cylinder part 34 of the second mounting member 16 protruding upward beyond the main rubber elastic body 18. This allows the flexible film 48 to be arranged above and away from the main rubber elastic body 18 in opposition to each other, and the upper opening of the second mounting member 16 is covered by the flexible film 48.

By attaching the flexible film 48 as described above, a fluid chamber 52 closed tight against the exterior containing a non-compressible fluid sealed therein is formed between the opposing faces of the main rubber elastic body 18 and the flexible film 48 in the axial direction. The non-compressible fluid sealed in the fluid chamber 52 is not particularly limited, but for example, water, alkylene glycol, polyalkylene glycol, silicone oil, or a mixture liquid thereof and the like can be favorably adopted. In addition, in order to efficiently obtain the vibration damping effect based on the flow behavior of the fluid described later, it is desirable to use a fluid of low viscosity at 0.1 Pa·s or less.

Also, a partition member 54 is arranged in the fluid chamber 52. The partition member 54 is a member in an approximate shape of a thick circular disc overall, and in the present embodiment, comprises a partition member main body 56 and a bottom plate member 58.

The partition member main body 56 is a hard member formed with synthetic resin, metal or the like in an approximate shape of a circular disc overall, and its outer peripheral portion is made thicker than the inner peripheral portion extending to both sides in the axial direction. In addition, on the inner periphery with a thinner wall, a storing concave portion 60 is formed in an approximate shape of a circle in the axial view opening downward. Moreover, on the outer periphery with a thicker wall, a peripheral groove 62 that opens to the outer peripheral surface is formed in a helical form in two tiers extending in a length of less than two rounds in the circumferential direction.

The bottom plate member 58 is a hard member, like the partition member main body 56, in an approximate shape of a thin circular disc made in a stepped form with the outer periphery protruding downward beyond the inner periphery.

Then, the bottom plate member 58 is overlapped with the bottom face of the partition member main body 56 in the axial direction. This causes the opening of the storing concave portion 60 to be closed by the bottom plate member 58 to form a cylinder-like storing cavity 64 between the overlapping surfaces of the partition member main body 56 and the bottom plate member 58.

In this storing cavity 64, a movable film 66 is arranged. The movable film 66 is a rubber elastic body in an approximate shape of a circular disc, the outer peripheral edge of which is made to be an annular thick support part 68 in an approximate shape of a circle in the longitudinal cross section. Then, the movable film 66 is stored and arranged in the storing cavity 64 to extend in the axis-perpendicular direction where the thick support part 68 is sandwiched between the partition member main body 56 and the bottom plate member 58. Although it is not necessarily evident in the drawing, the top and bottom faces of the movable film 66 are arranged away from the inner faces of the upper and lower walls of the storing cavity 64, respectively, in the axial direction so that a slight deformation of the movable film 66 in the thickness direction is allowed.

The partition member 54 with the structure described above is stored in the fluid chamber 52 and supported by the second mounting member 16. That is, the partition member 54 has its outer peripheral surface pressed against the second mounting member 16 by having its diameter reduced after being inserted into the small-diameter cylinder part 34 of the second mounting member 16. This allows the partition member 54 to be extended in the axis-perpendicular direction and arranged within the fluid chamber 52 to be supported by the second mounting member 16.

Also, the fluid chamber 52 is divided vertically into two sections across the partition member 54 by arranging the partition member 54 in the fluid chamber 52. Then, in the lower portion of the partition member 54 in the axial direction, a pressure-receiving chamber 70 whose wall is partially composed of the main rubber elastic body 18 is formed inducing internal pressure fluctuations at a vibration input. Meanwhile, in the upper portion of the partition member 54 in the axial direction, an equilibrium chamber 72 whose wall is partially composed of the flexible film 48 is formed that allows volume changes due to deformation of the flexible film 48. There is no need to say that the pressure-receiving chamber 70 and the equilibrium chamber 72 each contain a non-compressible fluid sealed therein.

Also, by having the outer peripheral surface of the partition member 54 overlapped with the second mounting member 16 via the sealing rubber layer 46, the opening on the outer periphery side of the peripheral groove 62 is covered fluid-tightly by the second mounting member 16. In addition, the peripheral groove 62 has its one end in the circumferential direction communicated with the pressure-receiving chamber 70 through a first communication hole 74 formed on the bottom plate member 58, while the other end in the circumferential direction is communicated with the equilibrium chamber 72 through a second communication hole (unillustrated) formed on the partition member main body 56. These allow an orifice passage 76 that places the pressure-receiving chamber 70 and the equilibrium chamber 72 in communication with each other to be formed using the peripheral groove 62. The tuning frequency of the orifice passage 76 is not particularly limited, but is set low at about 10 Hz in the present embodiment, which is in a range equivalent to the engine shake, by means of adjusting the ratio (A/L) of the cross sectional area of the passage (A) to the passage length (L) taking into account the wall spring rigidity of the pressure-receiving chamber 70 and the equilibrium chamber 72.

Also, a first through hole 78 is formed penetrating through the wall of the storing cavity 64 on the side of the pressure-receiving chamber 70, while a second through hole 80 is formed penetrating through the wall of the storing cavity 64 on the side of the equilibrium chamber 72. Then, the movable film 66 arranged in the storing cavity 64 receives liquid pressure of the pressure-receiving chamber 70 on its bottom face through the first through hole 78, while its top face receives liquid pressure of the equilibrium chamber 72 through the second through hole 80. This causes the movable film 66 to be elastically deformed in the thickness direction based on the relative pressure differential between the pressure-receiving chamber 70 and the equilibrium chamber 72 at a small-amplitude vibration input in the axial direction so as to absorb the pressure fluctuations in the pressure-receiving chamber 70. In other words, by means of substantial communication between the pressure-receiving chamber 70 and the equilibrium chamber 72 with each other via the first and second through holes 78, 80 caused by slight deformation of the movable film 66, liquid pressure of the pressure-receiving chamber 70 is transmitted to the equilibrium chamber 72 to be absorbed by volume changes of the equilibrium chamber 72. The distance between the inner faces of the upper and lower walls of the storing cavity 64 and the movable film 66 facing each other is set short so that the movable film 66 is substantially restrained by coming in contact with the inner faces of the upper and lower walls of the storing cavity 64 at a large-amplitude vibration input, thus preventing the liquid pressure absorption action described above from occurring.

On the mount main body 12 with the structure described above, an inner bracket 82 and an outer bracket 84, each made separately from the mount main body 12, are attached.

Figure 3:
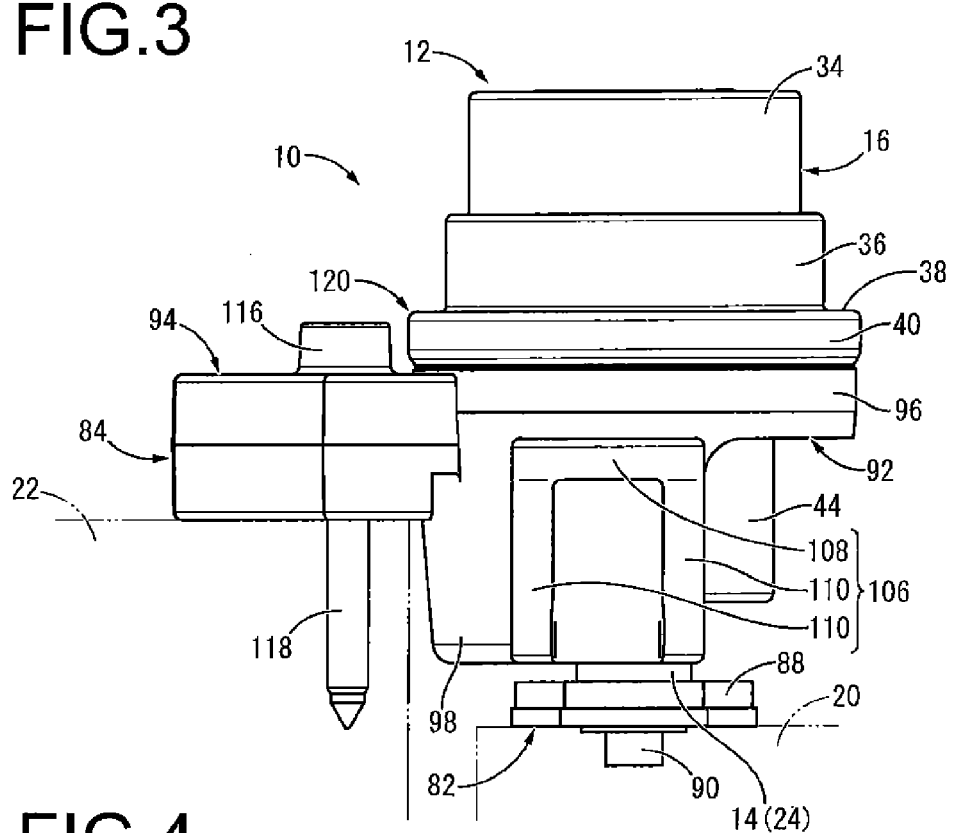
FIG. 3 is a rear view of the engine mount shown in FIG. 2.
Figure 4:
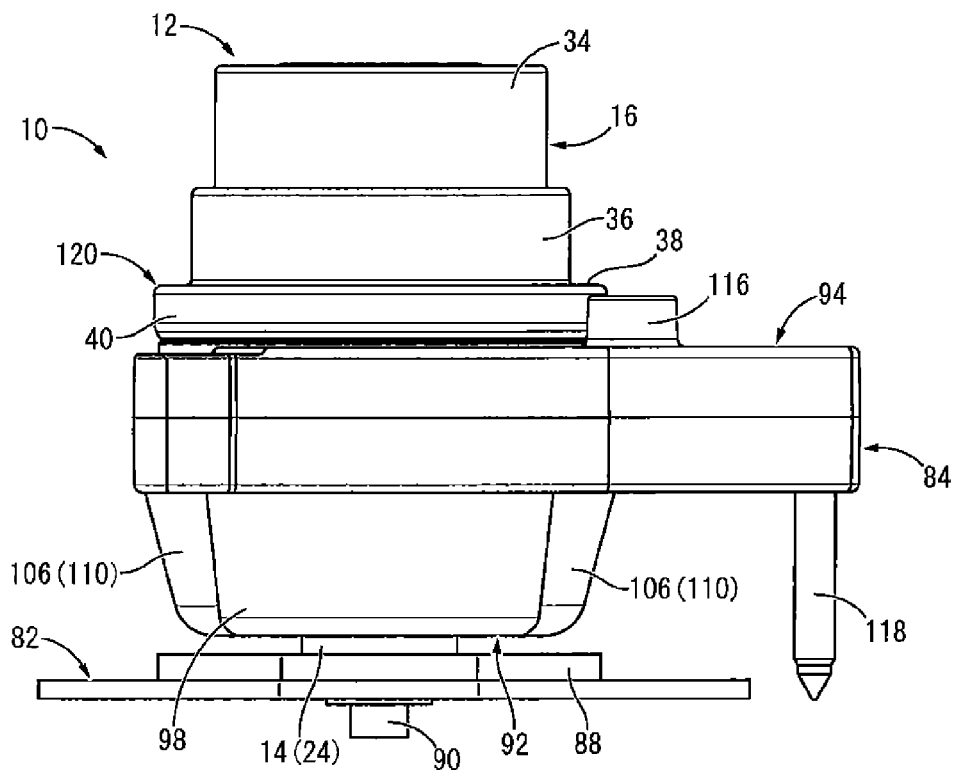
FIG. 4 is a right side view of the engine mount shown in FIG. 2.
Figure 5:
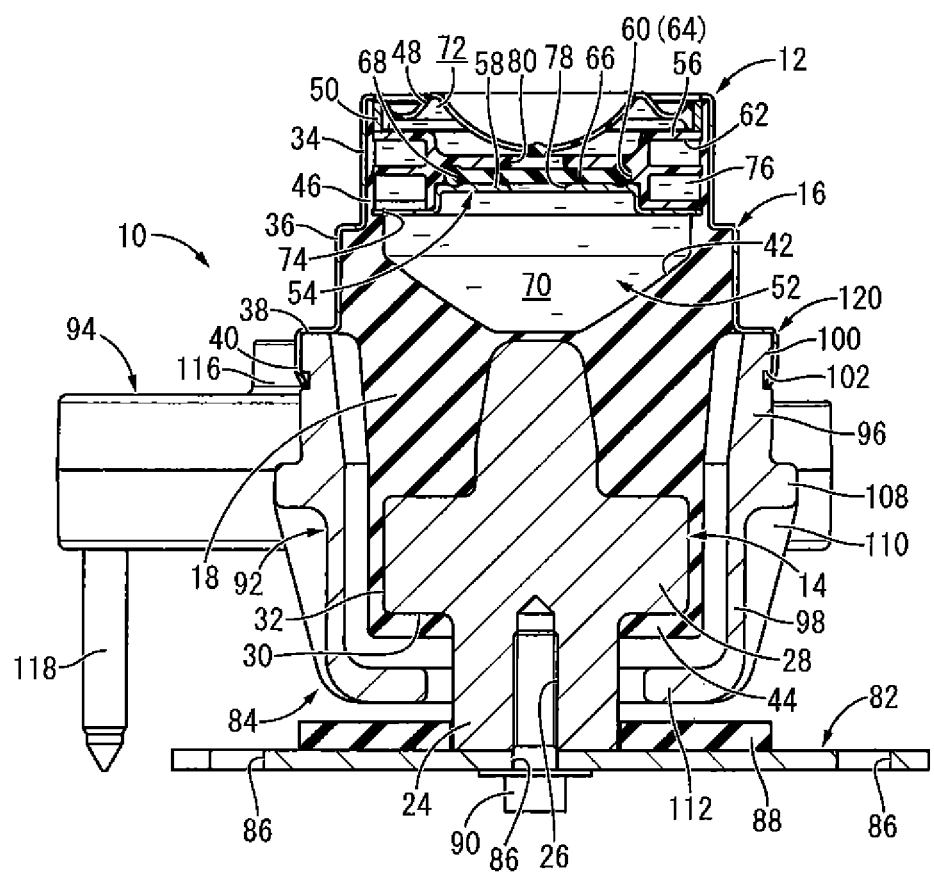
FIG. 5 is a cross sectional view taken along line 5-5 of FIG. 2.
Figure 6:
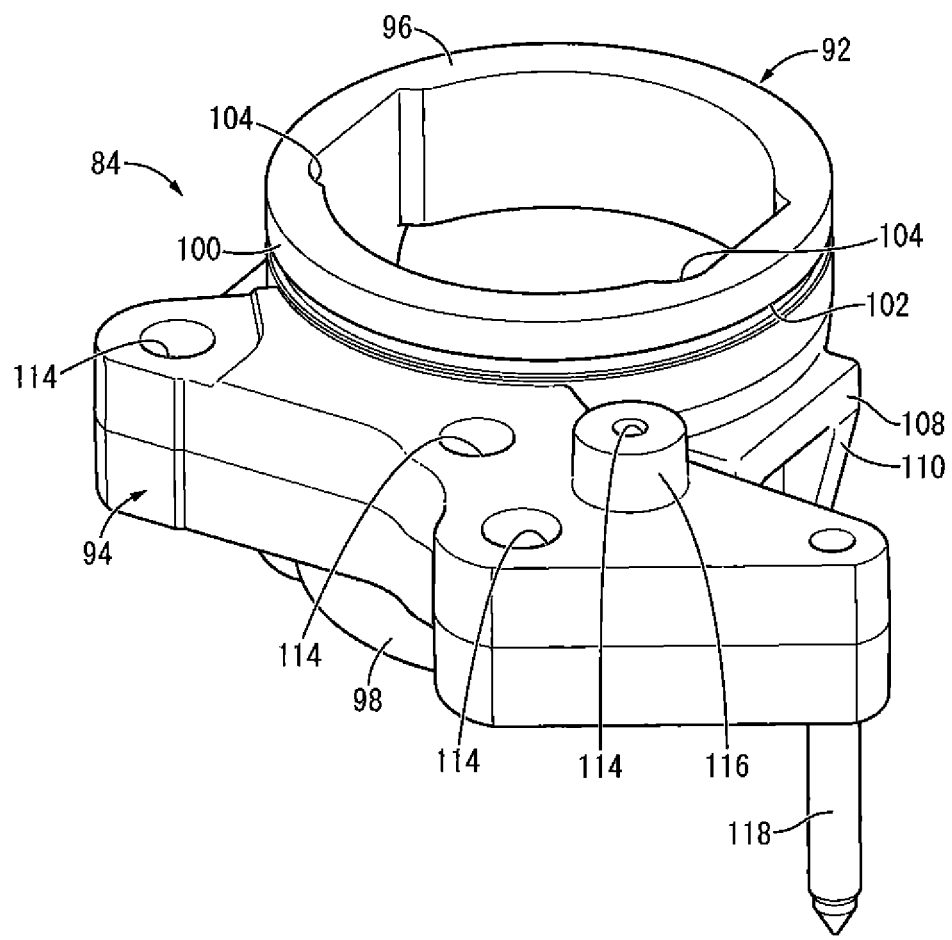
FIG. 6 is a perspective view of an outer bracket composing the engine mount shown in FIG. 1.

The inner bracket 82 is a high-rigidity member formed with a metal material and the like in an approximate shape of a rectangular plate overall, and its center portion in the long-side direction (left-right direction in FIG. 4) is made in an approximate shape of a circular disc protruding on both sides in the short-side direction (left-right direction in FIG. 3). In addition, the inner bracket 82 has bolt holes 86 formed penetrating therethrough at the center and both ends in the long-side direction.

Also, on the top face of the inner bracket 82, a rubber buffer 88 is fixed. The rubber buffer 88 is a plate-like rubber elastic body with a hole formed vertically penetrating through the center portion corresponding to the shape of the fixing part 24 of the first mounting member 14 in the axial view, through which the bolt hole 86 opens upward at the center.

Then, the inner bracket 82 is overlapped with the bottom face of the fixing part 24 of the first mounting member 14, and a bolt 90 is inserted from below into the bolt hole 86 provided at the center of the inner bracket 82. By screwing in such bolt 90 into the screw hole 26 of the fixing part 24, the inner bracket 82 and the first mounting member 14 are fixed to each other. This allows the inner bracket 82 to extend in the axis-perpendicular direction on the lower side of the first mounting member 14 to be supported thereby.

The outer bracket 84, like the inner bracket 82, is a high-rigidity member and is integrally provided, as shown in FIGS. 6 to 10, with a mounting part 92 to be attached to the second mounting member 16 and an attaching part 94 to be attached to the power unit 22. In addition, the mounting part 92 has a cylindrical part 96 and an extended part 98 integrally formed therewith.

The cylindrical part 96 is in approximately an annular or cylindrical shape, the top edge of which in the axial direction is provided continuously with a locking protrusion 100 protruding toward the outer periphery about the entire circumference. Also, in the present embodiment, the bottom portion of the cylindrical part 96 in the axial direction is made with nearly the same diameter as that of the upper portion where the locking protrusion 100 is provided. In summary, in the present embodiment, a locking groove 102 is formed in the axially intermediate section of the cylindrical part 96 opening to the outer peripheral surface and extending annularly in the circumferential direction with the outer diameter partially made smaller, while the locking protrusion 100 is provided on the upper side of the locking groove 102 about the entire circumference. Also, the cylindrical part 96 has concave grooves 104 at opposing positions in one radial direction (front-back direction of the vehicle under a condition of being mounted on board, which will be described later), each extending vertically in the axial direction opening to the inner peripheral surface so that each formation portion of the concave groove 104 in the cylindrical part 96 is partially made thinner along the circumference.

The extended part 98 extends downward from part of the circumference of the cylindrical part 96 in an approximate shape of a curved plate, which is provided continuously along the cylindrical part 96 for a little more than half a round of the circumference. Also, the extended part 98 has its both ends in the circumferential direction made thinner than the intermediate section thereof, whereas the concave groove 104 of the cylindrical part 96 reaches both ends of the extended part 98. In addition, a reinforcing rib 106 is provided at both ends of the extended part 98 in the circumferential direction, which are made thinner. The reinforcing rib 106, extending beyond the outer peripheral surface of the extended part 98 to be integrally formed therewith, has a lateral wall 108 that extends in the axis-perpendicular direction at the top edge of the extended part 98 as well as a pair of vertical walls 110, 110 that extend downward from both ends of the lateral wall 108. The vertical wall 110 of the present embodiment reaches the bottom edge of the extended part 98 with the protrusion length toward the outer periphery gradually decreasing downward, which effectively reinforces the extended part 98, while avoiding any interference with other members of the vertical wall 110.

Figure 7:
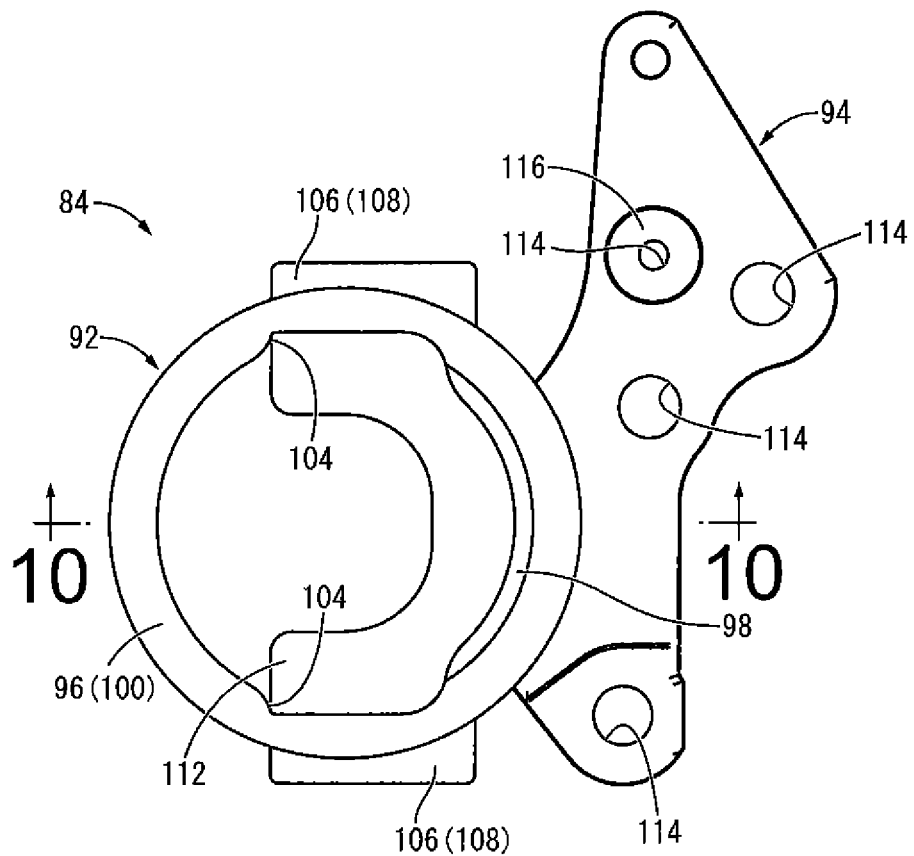
FIG. 7 is a plan view of the outer bracket shown in FIG. 6.
Figure 8:
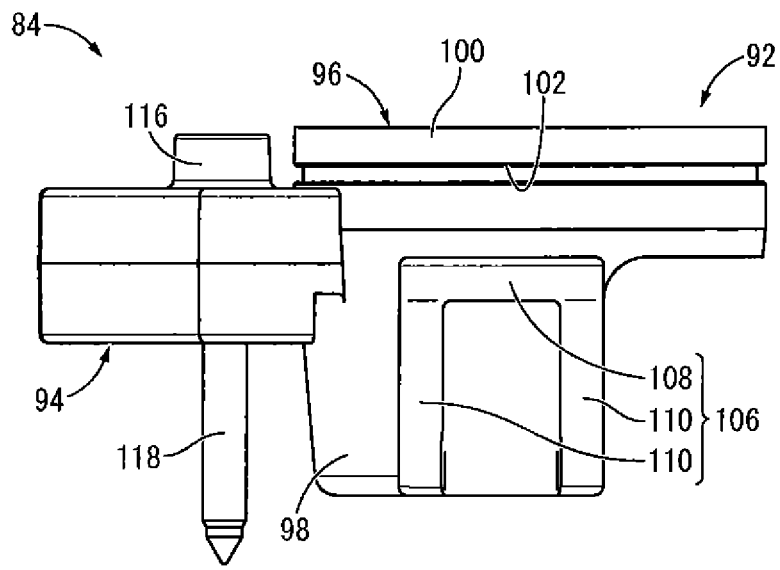
FIG. 8 is a rear view of the outer bracket shown in FIG. 7.
Figure 9:
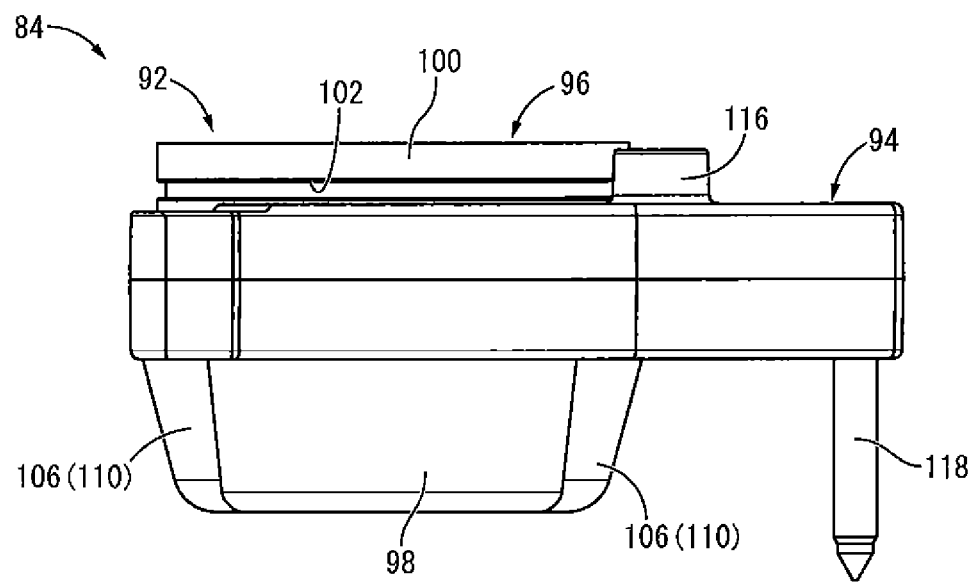
FIG. 9 is a right side view of the outer bracket shown in FIG. 7.
Figure 10:
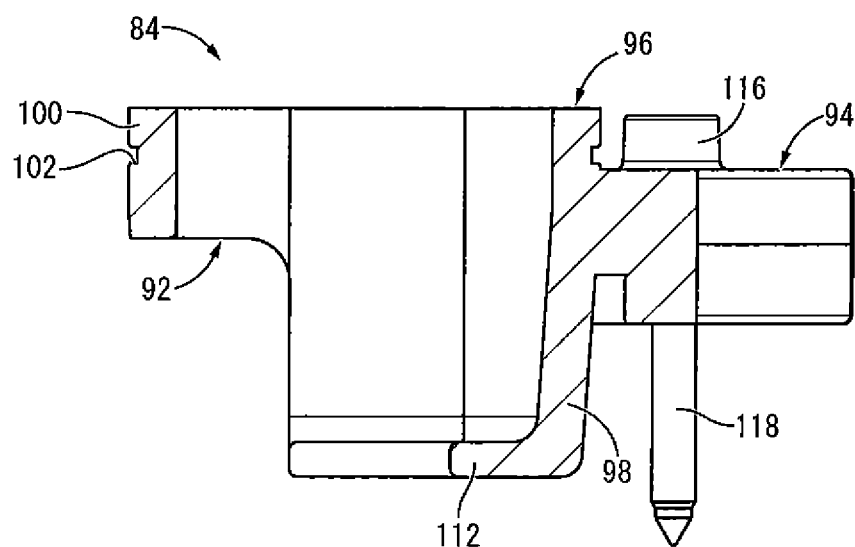
FIG. 10 is a cross sectional view taken along line 10-10 of FIG. 7.
Figure 11:
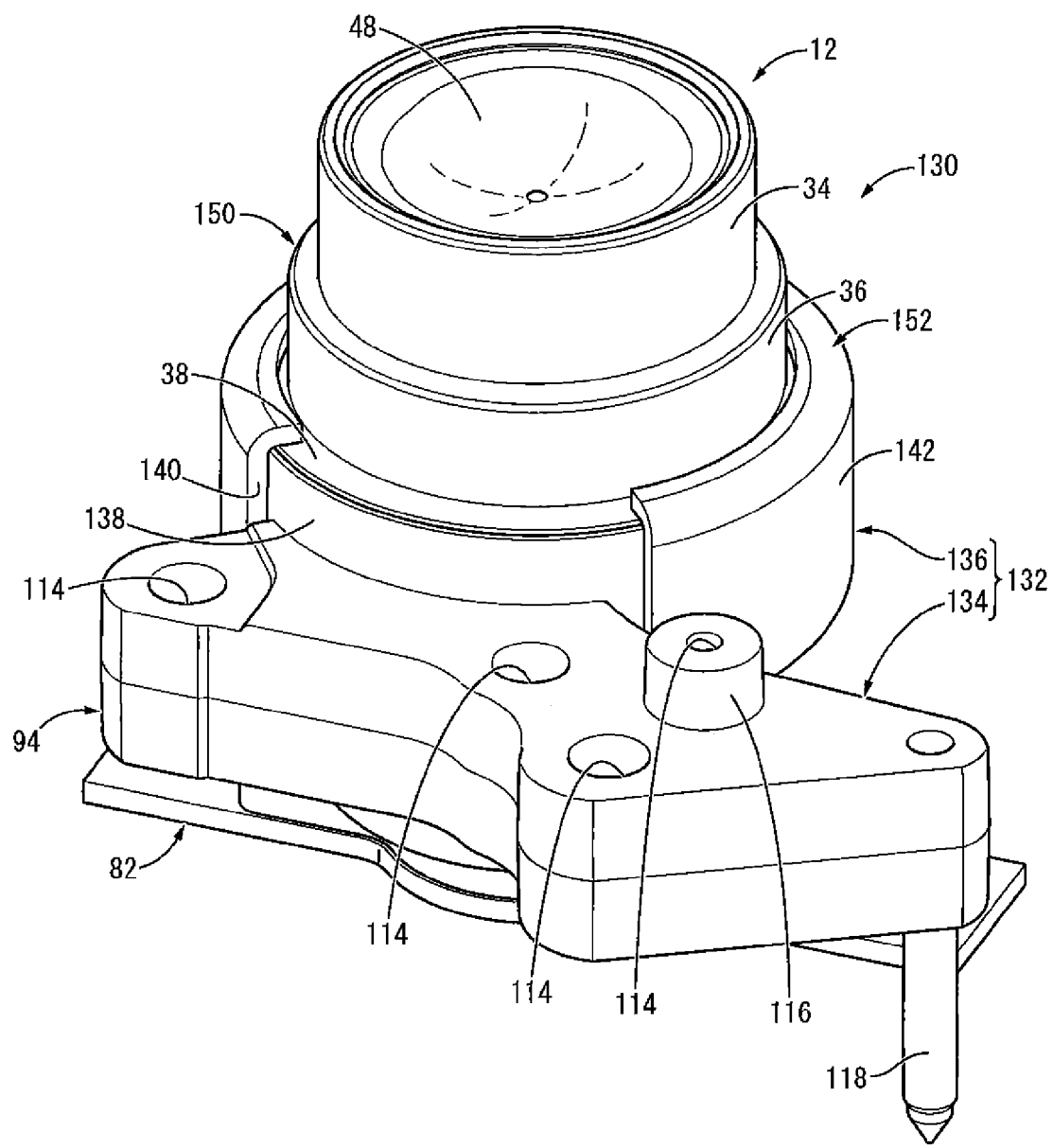
FIG. 11 is a perspective view of an engine mount as a second embodiment of the present invention.

Furthermore, at the bottom edge of the extended part 98, a stopper piece 112 is provided. The stopper piece 112, as shown in FIGS. 7 and 10, is a plate portion protruding from the bottom edge of the extended part 98 toward the inner periphery in the axis-perpendicular direction, being formed integrally with the extended part 98. Also, the stopper piece 112 is made in a curved form along the outline of the fixing part 24 in the axial view so as to allow the fixing part 24 of the first mounting member 14 to protrude downward beyond the stopper piece 112 under a condition where the outer bracket 84 is mounted to the mount main body 12, which will be described later. In the present embodiment, by making the protrusion length of the stopper piece 112 toward the inner periphery smaller than the curvature radius of the extended part 98, the insertion area of the fixing part 24 is formed on the inner peripheral side of the stopper piece 112. However, the structure of the insertion area of the fixing part 24 is not particularly limited, but for example, a hole can be formed penetrating through the stopper piece 112 in the thickness direction through which the fixing part 24 is inserted.

Also, the attaching part 94 is provided integrally with the cylindrical part 96 and the extended part 98. The attaching part 94 is in a form of a solid plate or block, and a plurality of bolt holes 114 are formed vertically penetrating therethrough at positions corresponding to the attaching structure on the side of the power unit 22. Also, as shown in FIG. 7, the attaching part 94 is approximately in a Z-shape in the axial view in the present embodiment, and around one of the bolt holes 114 provided on the bent portion, a fixing protrusion 116 is integrally formed protruding upward. This fixing protrusion 116 is provided to correspond to the structure of the power unit 22 having functions of forming a seating surface for the bolts and nuts as well as positioning against the power unit 22. On the attaching part 94, a positioning pin 118 is provided protruding downward, and by inserting it into an unillustrated positioning hole on the side of the power unit 22, the attaching part 94 is positioned against a member on the side of the power unit 22.

Then, the attaching part 94 protrudes sideways (to the right in FIG. 7) from the lower portion of the cylindrical part 96 than the locking groove 102 and from the top center of the extended part 98 in the circumferential direction to extend in the front-back direction of the vehicle (up-down direction in FIG. 7) described later. Also, the attaching part 94 is provided to protrude from the lower portion than a coupling part 120 described later (top edge of the cylindrical part 96 where the locking protrusion 100 is provided) in the axial direction, protruding sideways in nearly the axis-perpendicular direction.

The outer bracket 84 with the structure described above, as shown in FIGS. 1 to 5, is mounted to the second mounting member 16 of the mount main body 12 and arranged on the lower side of the second mounting member 16. That is, the outer bracket 84 has the top edge of the cylindrical part 96 provided with the locking protrusion 100 inserted into the locking piece 40 of the second mounting member 16 and is positioned relative to the second mounting member 16 in the axial direction by making the top face of the cylindrical part 96 in contact with the positioning part 38 of the second mounting member 16. Due to such positioning, the locking piece 40 protrudes downward beyond the locking protrusion 100 so that the bottom edge of the locking piece 40 is arranged along the outer peripheral opening of the locking groove 102 of the outer bracket 84. Then, by having the bottom edge of the locking piece 40 undergo a diameter-reducing deformation to be bend toward the inner periphery, the locking piece 40 enters into the locking groove 102 to be engaged with the locking protrusion 100 in the axial direction. This allows the second mounting member 16 and the outer bracket 84 to be coupled to each other at the bottom edge of the second mounting member 16 and the top edge of the outer bracket 84 so as to constitute a coupling part 120 of the present embodiment by the caulking fixation between the locking piece 40 and the locking protrusion 100 described above. Since the coupling part 120 in the present embodiment is provided continuously about the entire circumference by virtue of the cylindrical locking piece 40 and the annular locking protrusion 100, the second mounting member 16 and the outer bracket 84 are firmly coupled and fixed to each other.

In the present embodiment, the second mounting member 16 and the outer bracket 84 are positioned against each other in the radial direction by having the top edge of the locking piece 40 externally fitted onto the locking protrusion 100. The top edge of the locking piece 40 can be externally fitted onto the locking protrusion 100 with no tightening allowance, or can be treated with a diameter-reducing (crimping) process after being externally fitted onto the locking protrusion 100 and pressed thereagainst. Adopting such a diameter-reducing process, enforcement of the coupling in the axial direction can be achieved by virtue of increased friction, in addition to solidly achieving the positioning of the parts in the radial direction.

The outer bracket 84 coupled to the bottom edge of the second mounting member 16 in the manner described above is arranged on the outer peripheral side of the mount main body 12 at a given distance therefrom, extending downward from the second mounting member 16 with the extended part 98 reaching downward beyond the stopper part 28 of the first mounting member 14. Then, the extended part 98 of the outer bracket 84 is arranged in opposition to the stopper part 28 of the first mounting member 14 at a distance away therefrom in one radial direction, while the stopper piece 112 protruding from the bottom edge of the extended part 98 is arranged on the lower side of the stopper part 28 in opposition thereto. This constitutes an axis-perpendicular stopper member that regulates relative displacement between the first mounting member 14 and the second mounting member 16 in the axis-perpendicular direction by means of having the axis-perpendicular contact surface 32 of the stopper part 28 and the inner peripheral surface of the extended part 98 come in contact with each other via the rubber stopper 44. In addition, a rebound stopper member that regulates relative displacement between the first mounting member 14 and the second mounting member 16 in the direction of moving away from each other along the axis is constituted by means of making the lower contact surface 30 of the stopper part 28 and the top surface of the stopper piece 112 in contact with each other via the rubber stopper 44. The outer bracket 84 including the stopper piece 112 is arranged at a given distance away from the rubber stopper 44 under a condition of being mounted on a vehicle, which will be described later.

Furthermore, the stopper piece 112 of the outer bracket 84 is inserted into the opposing faces of the stopper part 28 of the first mounting member 14 and the inner bracket 82 in the axial direction, being arranged on the upper side of the fixed portion of the rubber buffer 88 at the inner bracket 82 in opposition thereto. Then, a bound stopper member that regulates relative displacement between the first mounting member 14 and the second mounting member 16 in the direction of moving closer to each other along the axis is constituted by means of making the top face of the inner bracket 82 and the bottom face of the stopper piece 112 in contact with each other via the rubber buffer 88. The stopper piece 112 is arranged at a given distance away from the rubber buffer 88 under a condition of being mounted on a vehicle, which will be described later.

As evident from the above description, in the engine mount 10 of the present embodiment, relative displacement of the first mounting member 14 and the second mounting member 16 is regulated by the axis-perpendicular stopper member, the rebound stopper member, and the bound stopper means to restrict the amount of deformation of the main rubber elastic body 18, thus enhancing the durability thereof.

The engine mount 10 of the present embodiment with the structure described above, as shown in FIG. 3, is mounted to a vehicle. That is, the power unit 22 is supported by the vehicular body 20 in a vibration damping manner via the engine mount 10 by having the first mounting member 14 attached to the vehicular body 20 via the inner bracket 82 and the second mounting member 16 attached to the power unit 22 via the outer bracket 84. Also, under a condition where the engine mount 10 is mounted to a vehicle, the stopper piece 112 is arranged in place away from the rubber stopper 44 and the rubber buffer 88 between the opposing faces of the stopper part 28 and the inner bracket 82 by the distributed load of the power unit 22 being input. Also, in the present embodiment, the power unit 22 is supported in such a way that it is overlapped in suspension with the bottom face of the attaching part 94 of the outer bracket 84 located on the lower side of the second mounting member 16 so that the center of gravity is set at a lower position under a condition of being mounted on the power unit 22. The engine mount 10 of the present embodiment is arranged on the right side of the power unit 22 under a condition of being mounted on a vehicle.

Then, once a low-frequency, large-amplitude vibration equivalent to the engine shake is inputted to the engine mount 10 under a condition of being mounted on a vehicle, fluid flow is induced between the pressure-receiving chamber 70 and the equilibrium chamber 72 through the orifice passage 76 based on relative pressure fluctuations between the pressure-receiving chamber 70 and the equilibrium chamber 72. This enables the intended vibration damping effect (high attenuation effect) to be exerted based on the flow behavior of the fluid such as the resonance action and the like. At a low-frequency, large-amplitude vibration input, the movable film 66 is substantially restrained by the walls of the storing cavity 64 to reduce the liquid-absorption action due to elastic deformation of the movable film 66 so that relative pressure differential between the pressure-receiving chamber 70 and the equilibrium chamber 72 is maintained significantly, thus efficiently inducing fluid flow through the orifice passage 76.

Once a mid- to high-frequency, small-amplitude vibration equivalent to the idling vibration or driving rumble is inputted to the engine mount 10, the orifice passage 76 is substantially shut off due to the anti-resonance. Meanwhile, since the inputted vibration is small-amplitude, the movable film 66 actively undergoes slight deformation in the thickness direction based on the relative pressure differential between the pressure-receiving chamber 70 and the equilibrium chamber 72 without being restrained by the walls of the storing cavity 64. This allows the pressure-receiving chamber 70 and the equilibrium chamber 72 to be substantially communicated with each other via the storing cavity 64 and first and second through holes 78, 80 due to elastic deformation of the movable film 66. As a result, liquid pressure in the pressure-receiving chamber 70 is transmitted to the equilibrium chamber 72 to be absorbed by volume changes of the equilibrium chamber 72 to avoid any increase in the dynamic spring constant due to substantial tight-closure of the pressure-receiving chamber 70, thus exerting the intended vibration damping effect (vibration isolation effect).

Also, during acceleration and deceleration of the vehicle, an inertial force of the power unit 22, as a load in the axis-perpendicular direction, is inputted to the second mounting member 16 via the outer bracket 84 to generate a moment in the falling direction around the center of gravity of the engine mount 10. In that situation of the engine mount 10, the outer bracket 84, which tends to be massive in order to achieve enough stopper strength and so forth, is coupled to the bottom edge of the second mounting member 16 at the top edge to be arranged to extend downward from the second mounting member 16. As a result, the center of gravity of the engine mount 10 is set lower to have the attaching part 94 of the outer bracket 84 arranged near the center of gravity in the axial direction, thereby reducing the moment in the falling direction that acts during acceleration and deceleration. Therefore, lack of rigidity of the engine mount 10 in the falling direction can be avoided to achieve stable support of the power unit 22, while achieving enhanced durability due to the restricted displacement of the main rubber elastic body 18 in the falling direction.

Furthermore, since the attaching part 94 of the outer bracket 84 extends sideways on the lower side of the coupling part 120 between the second mounting member 16 and the outer bracket 84, an inertial force of the power unit 22 is inputted on the lower side of the second mounting member 16. Therefore, the moment in the falling direction is effectively reduced due to the input of the inertial force, thereby achieving secured rigidity in the falling direction and enhanced durability of the main rubber elastic body 18. In addition, since the attaching part 94 of the present embodiment extends in the axis-perpendicular direction without tilting upward in the axial direction, the center of gravity is set on the lower side of the engine mount 10, thus reducing the moment at a load input in the axis-perpendicular direction more effectively.

Since the effect of setting the center of gravity on the lower side as described above can be exerted not only at an inertial force input during acceleration and deceleration but also at a load input in the axis-perpendicular direction such as a rolling load during cornering, running stability and the like of the vehicle is expected to improve.

Furthermore, in the engine mount 10, the coupling part 120 between the second mounting member 16 and the outer bracket 84 is constituted by caulking fixation of the locking piece 40 provided at the bottom edge of the second mounting member 16 to the locking protrusion 100 provided at the top edge of the outer bracket 84. This enables to obtain enough coupling strength due to the coupling part 120 having a small dimension in the axial direction to make it easier to set the center of gravity even lower, while enabling to omit any pre-treatment such as machining the press-fit face as compared to the case where press-fit fixing is adopted, thereby simplifying the manufacturing process. Moreover, by minimizing the overlap area between the second mounting member 16 and the outer bracket 84, weight saving of the engine mount 10 is achieved.

Also, since the engine mount 10 is made in an inverted form wherein the first mounting member 14 in a shape of a solid block is arranged below, while the second mounting member 16 with a thin wall is arranged above, the center of gravity is set on the lower side, thus achieving enhanced load bearing performance and durability and the like due to the reduced moment in the falling direction.

Furthermore, by having the outer bracket 84 extend downward beyond the stopper part 28, the stopper piece 112 provided at the bottom edge of the outer bracket 84 is arranged in opposition to the stopper part 28 on the lower side thereof. This allows the axis-perpendicular stopper member and the rebound stopper member to be provided at the lower portion of the engine mount 10 to prevent the center of gravity from moving upward due to the provision of the stopper members. In addition, since the stopper load in the axis-perpendicular direction is inputted to the lower portion of the engine mount 10, the moment in the falling direction caused by the stopper load is reduced.

Moreover, the inner bracket 82 and the stopper piece 112 of the outer bracket 84 are arranged in opposition to each other in the axial direction, thus the bound stopper member is provided at the lower portion of the engine mount 10. This prevents the center of gravity of the engine mount 10 from moving upward due to the provision of the bound stopper member, thus enhancing the load bearing performance and durability and the like due to the lower center of gravity.

FIGS. 11 to 15 show an automotive engine mount 130 as a second embodiment of the vibration damping device with the structure according to the present invention. The engine mount 130 has a structure where the inner bracket 82 and an outer bracket 132 are mounted to the mount main body 12. In the following descriptions, substantially the same members and parts as those of the engine mount 10 of the first embodiment are not discussed in detail by assigning the same numerals to the equivalent components in each drawing.

The outer bracket 132 comprises an attaching member 134 and a coupling member 136. The attaching member 134 is a high-rigidity member formed with iron, aluminum alloy or the like, and is provided with a mounting cylindrical part 138 in approximately a cylindrical or annular shape and the attaching part 94 that extends sideways from part of the circumference of the mounting cylindrical part 138.

The coupling member 136 is a high-rigidity member, like the attaching member 134, in a shape of a cylinder extending with substantially unchanging cross section in the circumferential direction, while a cutout portion 140 is formed on part of the circumference for a length of about one quarter round of the circumference. In other words, the coupling member 136 extends with substantially unchanging cross section for a length of about three quarter round around the central axis to form an approximate circular arc in the axial view. Also, the coupling member 136 has its upper portion made to be a large-diameter locking piece 142 while its lower portion is made to be a small-diameter extended part 144, and the locking piece 142 and the extended part 144 are integrally provided via a stepped part 146 that extends in the axis-perpendicular direction. In addition, at the bottom edge of the coupling member 136, a plate-like stopper piece 148 protruding toward the inner periphery is integrally formed.

Figure 12:
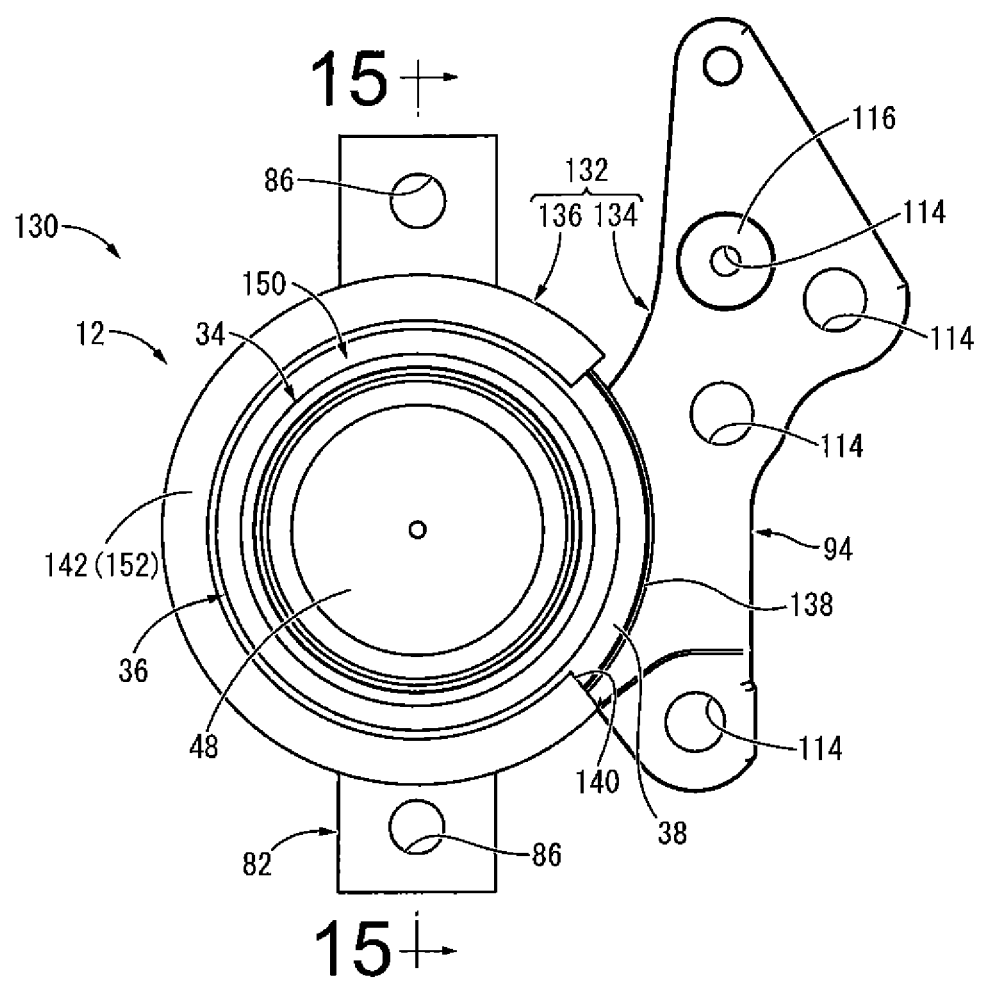
FIG. 12 is a plan view of the engine mount shown in FIG. 11.
Figure 13:
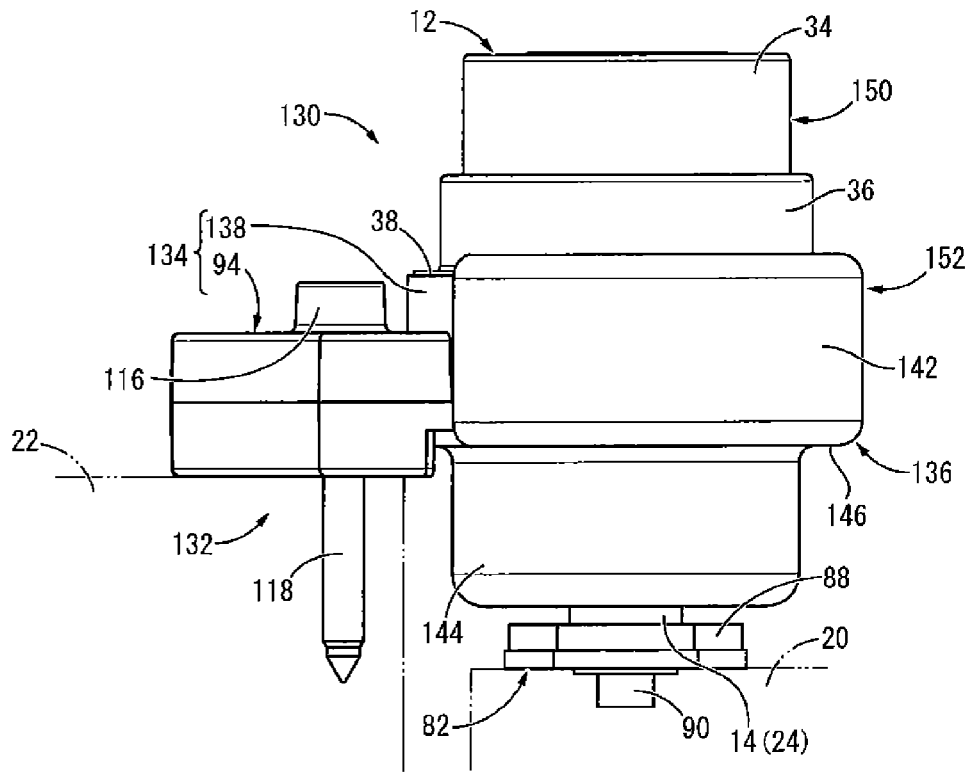
FIG. 13 is a rear view of the engine mount shown in FIG. 12.
Figure 14:
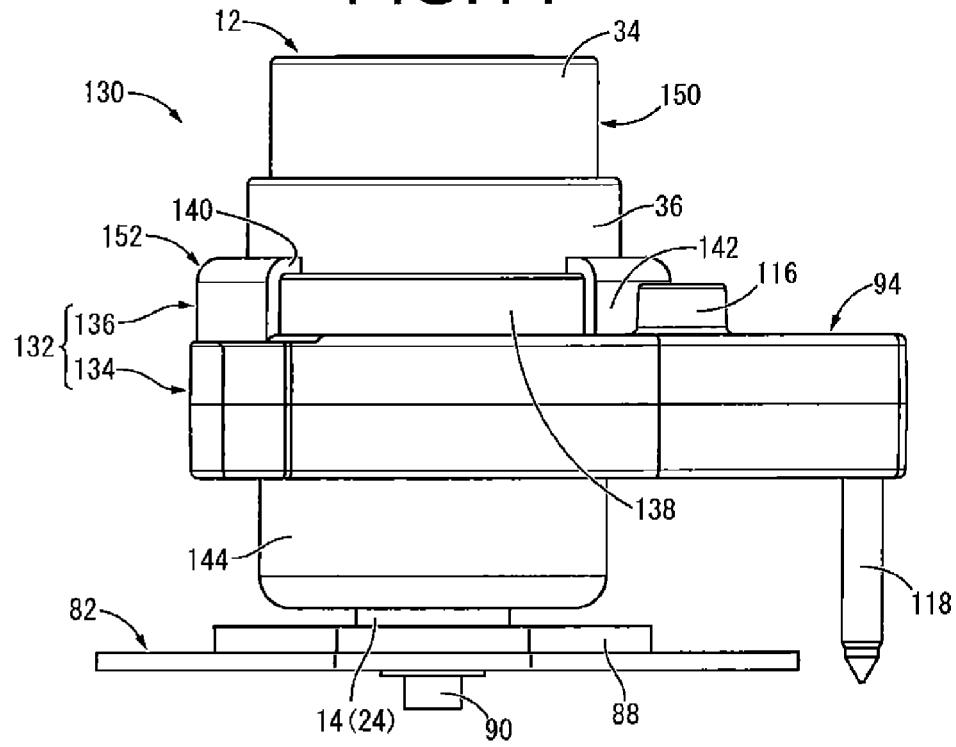
FIG. 14 is a right side view of the engine mount shown in FIG. 12.
Figure 15:
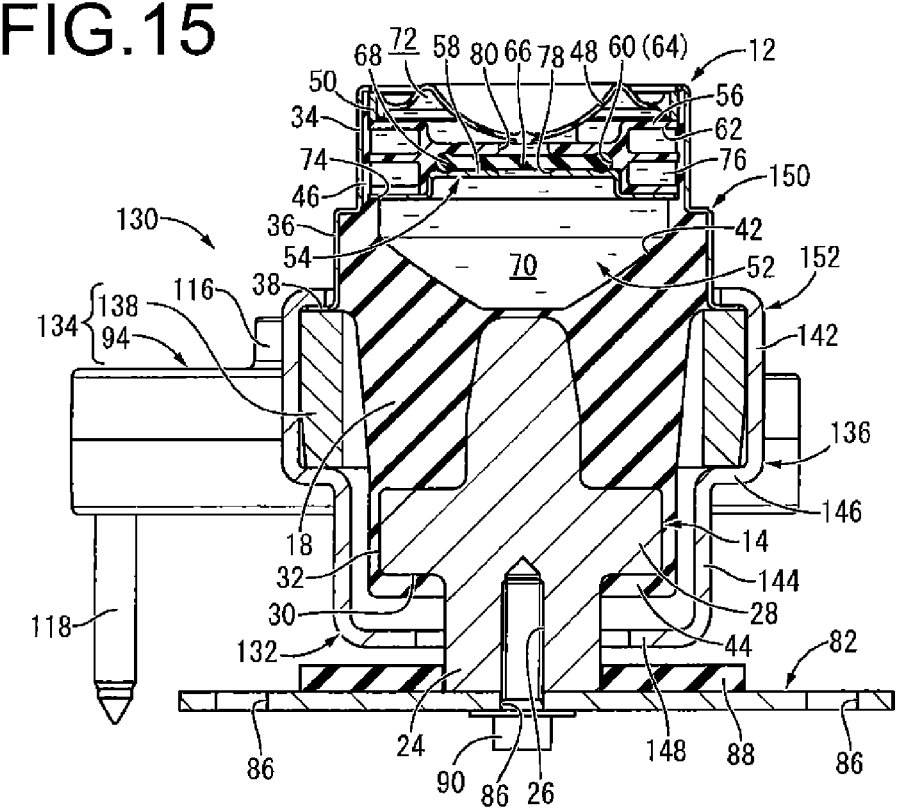
FIG. 15 is a cross sectional view taken along line 15-15 of FIG. 13.

The outer bracket 132 composed of the attaching member 134 and the coupling member 136 is attached to a second mounting member 150 of the mount main body 12. That is, the mounting cylindrical part 138 of the outer bracket 132 is externally fitted onto the main rubber elastic body 18 from below, the top face of which is overlapped with the positioning part 38 of the second mounting member 150, and thereafter, the locking piece 142 of the coupling member 136 is externally fitted onto the bottom edge of the second mounting member 150 and the mounting cylindrical part 138. Then, the positioning part 38 and the mounting cylindrical part 138 are sandwiched between the stepped part 146 and the top edge of the locking piece 142 in the axial direction by having the top edge of the locking piece 142 extending upward beyond the positioning part 38 bent toward the inner periphery. Thus, by fixing the locking piece 142 by caulking to the positioning part 38 and the mounting cylindrical part 138, a coupling part 152 is composed that couples and fixes the bottom edge of the second mounting member 150 and the top edge of the outer bracket 132 to each other, thus the outer bracket 132 extends downward supported by the second mounting member 150. The second mounting member 150 of the present embodiment has a structure of the second mounting member 16 of the first embodiment wherein the locking piece 40 extending downward from the outer peripheral edge of the positioning part 38 is omitted. Also, the attaching part 94 of the attaching member 134, as shown in FIG. 12, protrudes sideways through the cutout portion 140 of the coupling member 136. In addition, the outer bracket 132 of the present embodiment has its cylindrical part composed by the mounting cylindrical part 138 and the locking piece 142.

Even in the engine mount 130 with the structure according to the present embodiment, the same effects as those of the engine mount 10 of the first embodiment can be effectively obtained. Also, as evident from the structure of the engine mount 130, the structure of the outer bracket 132 is not necessarily composed of a single part but can be composed by assembling multiple parts.

Figure 16:
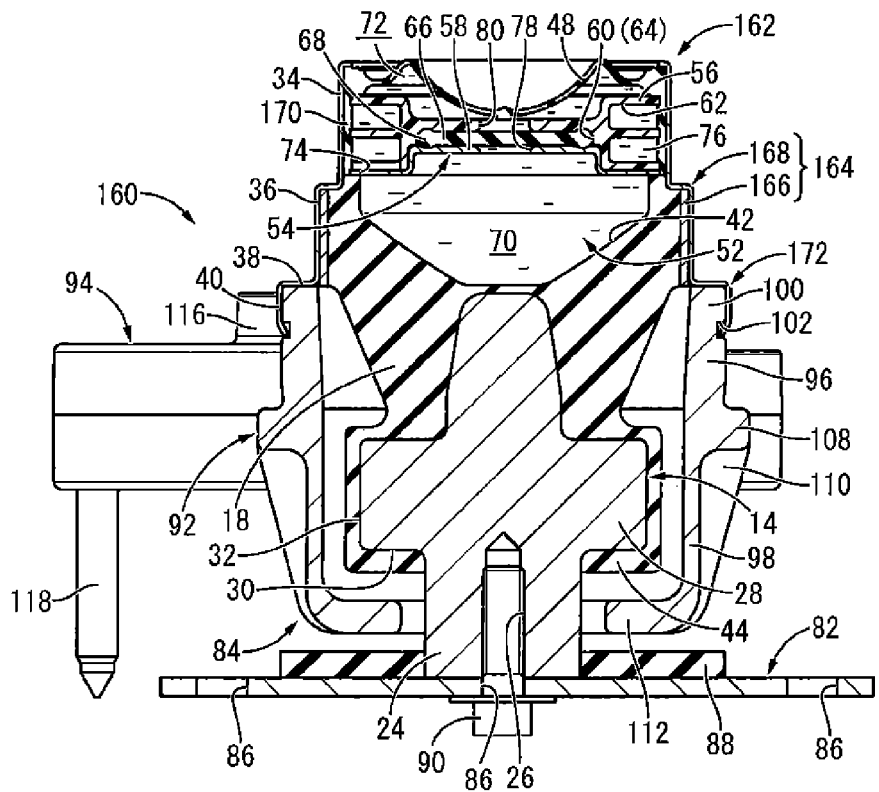
FIG. 16 is a longitudinal cross sectional view showing an engine mount as a third embodiment of the present invention.

FIG. 16 shows an automotive engine mount 160 as a third embodiment of the vibration damping device with the structure according to the present invention. The engine mount 160 has a structure where the inner bracket 82 and the outer bracket 84 are attached to a mount main body 162.

More specifically, the mount main body 162 has a structure where the first mounting member 14 and a second mounting member 164 are elastically connected by the main rubber elastic body 18, while the second mounting member 164 comprises an intermediate sleeve 166 and an outer cylindrical member 168.

The intermediate sleeve 166 is a high-rigidity member formed with a metal material and the like in an approximate shape of a large-diameter cylinder, on the lower side which is arranged the first mounting member 14 on the same central axis, and the first mounting member 14 and the intermediate sleeve 166 are elastically connected by the main rubber elastic body 18. The main rubber elastic body 18 of the present embodiment is formed as an integrally vulcanization molded component provided with the first mounting member 14 and the intermediate sleeve 166, and the inner peripheral surface of the intermediate sleeve 166 is bonded by vulcanization to the outer peripheral surface of the main rubber elastic body 18 on the side of the large-diameter end. Also, in the main rubber elastic body 18 of the present embodiment, a constricted portion is provided on the upper side of the stopper part 28 of the first mounting member 14 where the diameter is partially reduced in the intermediate position in the axial direction. Additionally, in the present embodiment, the sealing rubber layer 46 formed integrally with the main rubber elastic body 18 is omitted.

The outer cylindrical member 168 is a high-rigidity member formed with a metal material and the like similar to that of the intermediate sleeve 166 in an approximate shape of a thin-wall, large-diameter cylinder overall. Since the outer cylindrical member 168 has a similar structure to that of the second mounting member 16 of the first embodiment, further descriptions are omitted by assigning the same numerals as those of the second mounting member 16 to the equivalent parts of the outer cylindrical member 168.

In addition, the outer peripheral edge of the flexible film 48 is bonded by vulcanization to the bottom edge of the small-diameter cylinder part 34 of the outer cylindrical member 168. Also, the inner peripheral surface of the small-diameter cylinder part 34 of the outer cylindrical member 168 is covered by a sealing rubber layer 170 in a cylindrical shape formed integrally with the flexible film 48.

Then, the intermediate sleeve 166 composing the integrally vulcanization molded component of the main rubber elastic body 18 is inserted into the large-diameter cylinder part 36 of the outer cylindrical member 168, while, by treating the large-diameter cylindrical part 36 with a diameter-reducing process, the intermediate sleeve 166 and the outer cylindrical member 168 are fitted and fixed to each other to form the second mounting member 164. Also, by the fixation of the intermediate sleeve 166 to the outer cylindrical member 168, the fluid chamber 52 closed tight against the exterior is formed between the main rubber elastic body 18 and the flexible film 48.

To the mount main body 162 with the structure described above, the outer bracket 84 is attached. That is, a coupling part 172 is formed by inserting the top edge of the outer bracket 84 provided with the locking protrusion 100 into the locking piece 40 provided on the outer cylindrical member 168 of the second mounting member 164 to be fixed by caulking thereto, and the outer bracket 84 is coupled and fixed to the second mounting member 164 at the coupling part 172.

Thus, the second mounting member is not necessarily limited to the one composed of a single member bonded by vulcanization to the main rubber elastic body 18, but can be composed of a combination of multiple members.

Figure 17:
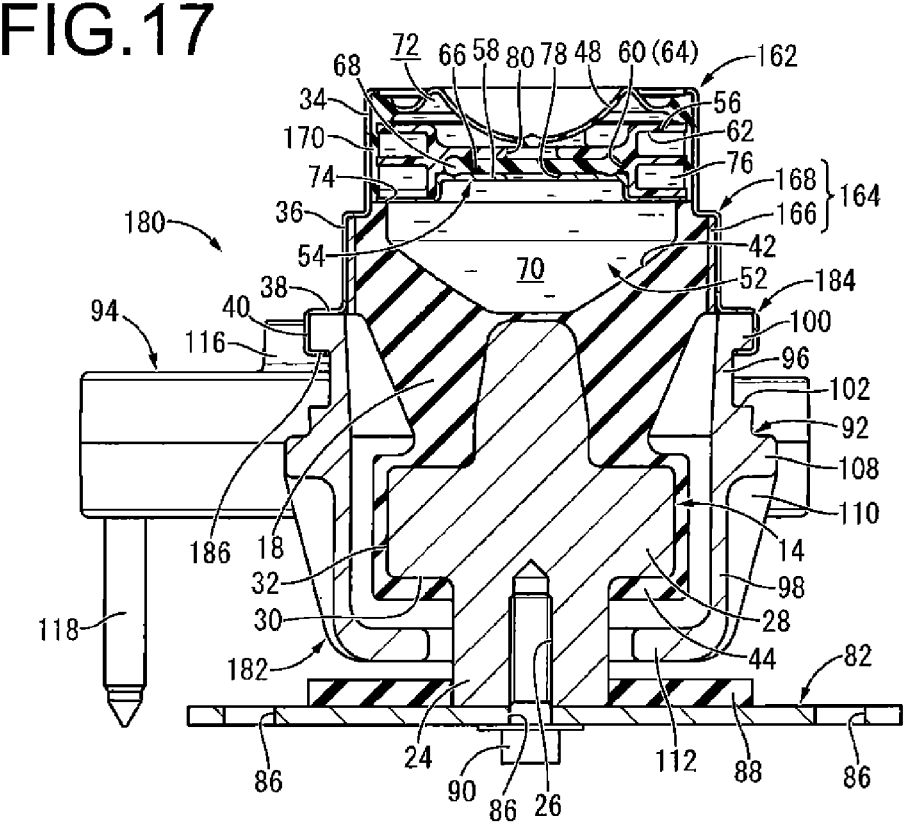
FIG. 17 is a longitudinal cross sectional view showing an engine mount as a fourth embodiment of the present invention.

FIG. 17 shows an automotive engine mount 180 as a fourth embodiment of the vibration damping device with the structure according to the present invention. The engine mount 180 has a structure where the inner bracket 82 and an outer bracket 182 are attached to the same mount main body 162 as the one of the third embodiment described above.

The outer bracket 182 has the locking groove 102 with its width and depth made larger, and at a coupling part 184 that couples the second mounting member 164 and the outer bracket 182, a bottom edge 186 of the locking piece 40 is overlapped in contact with the bottom face of the locking protrusion 100 almost all over thereof. This creates the coupling part 184 with better load bearing performance in the axial direction. By making the width of the locking groove 102 large enough, it is made possible to insert a jig into the locking groove 102 in order to bend the locking piece 40 toward the inner periphery.

Figure 18:
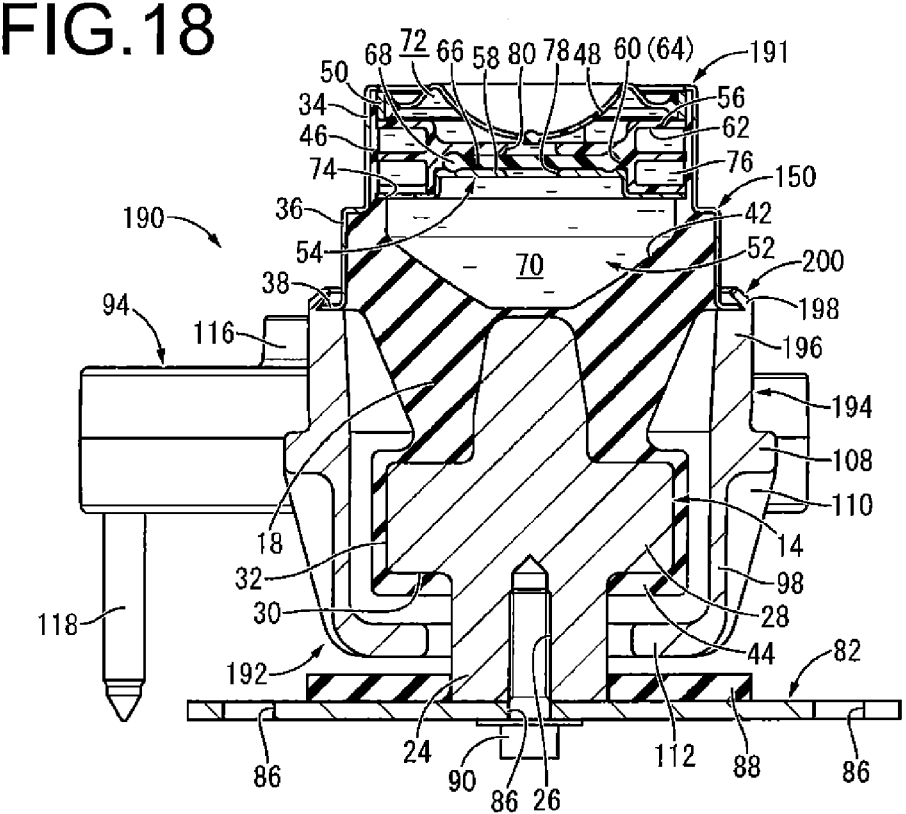
FIG. 18 is a longitudinal cross sectional view showing an engine mount as a fifth embodiment of the present invention.

FIG. 18 shows an automotive engine mount 190 as a fifth embodiment of the vibration damping device with the structure according to the present invention. The engine mount 190 has a structure where the inner bracket 82 and an outer bracket 192 are attached to a mount main body 191. In the mount main body 191 of the present embodiment, the sealing rubber layer, the flexible film and the fixing member take the same shape as those of 46, 48 and 50, respectively, of the first embodiment described above. Also, as a shape of the second mounting member, the shape of the second mounting member 150 of the second embodiment described above is adopted. Furthermore, as a shape of the main rubber elastic body, the shape of the main rubber elastic body 18 of the third embodiment described above is adopted.

More specifically, the outer bracket 192 is integrally provided with a mounting part 194 and the attaching part 94, and further, the mounting part 194 is provided with a cylindrical part 196 and the extended part 98. The cylindrical part 196 is in an approximate shape of a thick-wall cylinder, while a locking piece 198 in a shape of a thin cylinder is integrally formed protruding upward from the outer peripheral edge thereof. Also, the inner diameter at the top edge of the cylindrical part 196 is made smaller than the outer diameter of the positioning part 38 of the second mounting member 16, while the inner diameter of the locking piece 198 is made larger than the outer diameter of the positioning part 38.

The outer bracket 192 with the structure described above is attached to the second mounting member 150. That is, the cylindrical part 196 of the outer bracket 192 is externally fitted onto the main rubber elastic body 18 from below to make the top surface of the cylindrical part 196 in contact with the bottom surface of the positioning part 38, thereby externally fitting the locking piece 198 onto the positioning part 38 from below so that the second mounting member 150 and the outer bracket 192 are relatively positioned. Then, the locking piece 198 is bent so as to gradually tilt toward the inner periphery as it moves toward the protrusion tip so that the positioning part 38 is sandwiched between the top face of the cylindrical part 196 and the locking piece 198. By this kind of caulking fixation, a coupling part 200 that couples the second mounting member 150 and the outer bracket 192 to each other is composed where the outer bracket 192 extends downward beyond the second mounting member 150.

Thus, the locking piece does not necessarily have to be provided on the side of the second mounting member, but can be formed to protrude from the outer bracket side as is the case with the locking piece 198 of the present embodiment.

As evident from each of the second to fifth embodiments, the coupling structure at the coupling part is not particularly limited and any structure can be adopted as long as the coupling between the second mounting member and the outer bracket is achieved by the locking. Also, the shape of the outer bracket, the second mounting member, and the flexible film and so forth can be designed differently as appropriate, and the engine mount relating to the present invention not only has a broad range freedom in designing but also a broad range freedom in tuning to the vibration.

Embodiments of the present invention have been described above, but the present invention is not limited to those specific descriptions. For example, in the embodiments described above, the vibration damping device is exemplified by a fluid-filled vibration damping device utilizing the flow behavior of the fluid sealed therein, but it is not limited to such a fluid filled type.

Also, the coupling part does not have to be provided continuously about the entire circumference, but can be provided on part thereof, or can be provided intermittently at given intervals about the entire circumference.

Furthermore, in the first embodiment, for example, the coupling part 120 is constituted by fixing the locking piece 40 by caulking to the locking protrusion 100 by means of bending the bottom edge of the locking piece 40 toward the inner periphery after the insertion of the locking protrusion 100 into the locking piece 40, but the structure of the coupling part 120 is not limited to the one using caulking. More specifically, for example, a hook part protruding toward the inner periphery can be provided in advance at the bottom edge of the locking piece 40, while on the cylindrical part 96 of the outer bracket 84, a narrow locking groove is formed opening to the outer peripheral surface thereof. Then, after inserting the cylindrical part 96 into the locking piece 40, the hook part is inserted into the locking groove by means of treating the locking piece 40 with a diameter-reducing process (crimping) to constitute the coupling part by means of locking the hook part with the locking groove in the axial direction.

Moreover, the structure of the attaching part 94 is just an example, and the shape of the attaching part 94 itself, the position of the bolt hole 114 and the like can be modified as appropriate depending on the structure of the power unit 22.

Also, the stopper part 28 is not necessarily limited to the one in an annular shape that protrudes in a substantially unchanging size about the entire circumference, but for example, can be in a ring shape having a rectangular or irregular outline in a plan view with varying protrusion heights along the periphery. Furthermore, by providing the stopper part partially along the periphery, the opposing flats can be configured for positioning the first mounting member 14 against the outer bracket 84 in the circumferential direction.

The vibration damping device relating to the present invention is not only adopted as an engine mount, but can be adopted as a sub-frame mount, a body mount, a differential mount or the like. Also, the present invention is applied not only to vibration damping devices for motor vehicles but also can be favorably applied to vibration damping devices for motor cycles, railroad vehicles, and industrial vehicles.

What is claimed is:

1. A vibration damping device comprising:
    a first mounting member, the first mounting member including a stopper part integrally formed from the same material with the first mounting member, and the stopper part transversely protruding away from the first mounting member in a direction towards an outer periphery of the vibration damping device;
    an at least partially cylindrical second mounting member extending vertically such that the first mounting member is arranged on a lower side of the second mounting member;
    a main rubber elastic body elastically connecting the first mounting member and the second mounting member, the first mounting member being configured to be attached to a member to be vibration-damped while the second mounting member is configured to be attached to a vibration source;
    a separate outer bracket arranged on the lower side of the second mounting member; and
    a coupling part being constituted by engagement between a bottom edge of the second mounting member and a top edge of the outer bracket; wherein
        the outer bracket is coupled to the second mounting member at the coupling part, the outer bracket including an attaching part that is positioned lower than the coupling part and that perpendicularly protrudes sideways from a downwardly extending portion of the outer bracket, the outer bracket comprises a positioning pin perpendicularly extending downwards and away from the attaching part, the outer bracket is configured to be attached to the vibration source at the attaching part via the positioning pin such that the second mounting member is attached to the vibration source via the outer bracket, the downwardly extending portion extending downward from the coupling part while being located outside of the first mounting member, and separated outwardly away from the first mounting member in an axis-perpendicular direction, which is a direction perpendicular to a longitudinal axis of the vibration damping device, so as to be arranged in opposition thereto, and the stopper part is arranged in opposition to the downwardly extending portion of the outer bracket at a given distance interposed therebetween in the axis-perpendicular direction, the downwardly extending portion extending downward beyond the stopper part;

an axis-perpendicular stopper member that regulates relative displacement between the first mounting member and the second mounting member in the axis-perpendicular direction is constituted by contact between the stopper part and the downwardly extending portion of the outer bracket, a stopper piece is provided at a bottom edge of the downwardly extending portion of the outer bracket, the stopper piece protruding toward an inner periphery of the vibration damping device so that the stopper piece is arranged on a lower side of the stopper part in opposition thereto at a given distance interposed therebetween in a direction along the longitudinal axis of the vibration damping device; and a rebound stopper member that regulates relative displacement between the first mounting member and the second mounting member in a direction of moving away from each other along the longitudinal axis of the vibration damping device is constituted by contact between the stopper part and the stopper piece.

2. The vibration damping device according to claim 1, wherein an inner bracket is arranged on a lower side of the first mounting member, the inner bracket being configured to attach the first mounting member to the member to be vibration-damped;

the stopper piece is arranged on an upper side of the inner bracket in opposition thereto at a given distance interposed therebetween in a direction along the longitudinal axis of the vibration damping device;

a bound stopper member that regulates relative displacement between the first mounting member and the second mounting member in a direction of moving closer to each other along the longitudinal axis of the vibration damping device is constituted by contact between the inner bracket and the stopper piece.

3. The vibration damping device according to claim 1, wherein the coupling part that couples the second mounting member and the outer bracket is provided continuously about an entire circumference.

4. The vibration damping device according to claim 1, wherein a locking piece is provided to protrude to a lower side of the second mounting member than a portion of the second mounting member onto which the main rubber elastic body is bonded; and a locking protrusion is provided at the top edge of the outer bracket protruding toward an outer periphery of the vibration damping device so as to constitute the coupling part by means of inserting the locking protrusion of the outer bracket into the locking piece of the second mounting member and fixing the locking piece by caulking to the locking protrusion.

5. The vibration damping device according to claim 1, wherein the second mounting member extends upward beyond the main rubber elastic body while an upper opening of the second mounting member is covered by a flexible film so as to form a fluid chamber with a non-compressible fluid sealed therein between the main rubber elastic body and the flexible film.

* * * * *